US007062529B2

(12) United States Patent
Deboer et al.

(10) Patent No.: US 7,062,529 B2
(45) Date of Patent: Jun. 13, 2006

(54) SERVER CONFIGURATION TOOL

(75) Inventors: Timothy G. Deboer, Toronto (CA); Timothy M. Francis, Keswick (CA); Sheldon B. Wosnick, Richmond Hill (CA); Siu Chung Yuen, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 10/063,968

(22) Filed: May 30, 2002

(65) Prior Publication Data

US 2003/0005104 A1   Jan. 2, 2003

(30) Foreign Application Priority Data

May 30, 2001   (CA)  .................................. 2349083

(51) Int. Cl.
*G06F 15/16* (2006.01)

(52) U.S. Cl. ...................................... 709/203; 709/219

(58) Field of Classification Search ................ 709/203, 709/208, 217–219, 220–225, 227
See application file for complete search history.

(56) References Cited

U.S. PATENT DOCUMENTS

| | | | | |
|---|---|---|---|---|
| 5,553,239 | A |   | 9/1996 | Heath et al. ........... 395/187.01 |
| 5,819,030 | A |   | 10/1998 | Chen et al. .............. 395/200.5 |
| 5,828,843 | A | * | 10/1998 | Grimm et al. .............. 709/228 |
| 6,061,692 | A | * | 5/2000 | Thomas et al. ............. 707/200 |
| 6,128,730 | A | * | 10/2000 | Levine ......................... 713/1 |
| 6,182,136 | B1 | * | 1/2001 | Ramanathan et al. ....... 709/224 |
| 6,393,477 | B1 |   | 5/2002 | Paxhia et al. ............... 709/223 |
| 6,449,642 | B1 | * | 9/2002 | Bourke-Dunphy et al. . 709/222 |

(Continued)

OTHER PUBLICATIONS

EN997156—U.S. Appl. No. 09/135,149, filed Aug. 17, 1998, System and Method for Configuring and Administering Multiple Instances of Web Servers, Ludovici et al., 92 pgs.

(Continued)

*Primary Examiner*—Zarni Maung
*Assistant Examiner*—Van Kim T. Nguyen
(74) *Attorney, Agent, or Firm*—Scully, Scott, Murphy & Presser, P.C.; Richard Lau, Esq.

(57) ABSTRACT

Embodiments of the present invention separates raw server configuration data (data describing how the server is to operate—e.g., network port number, security settings, software drivers, etc.) from server instance data (data which describes where to run a server and how to process user code—e.g., which directories to access, where the user code is located, etc.). Embodiments of the present invention may have raw server configuration data and server instance data stored as, for example, text files. A file embodying raw server configuration data may be copied and reused on multiple computer systems. Similarly, a file embodying server instance data may also be copied and reused on multiple computer systems. Embodiments of the present invention process the raw server configuration data file and the server instance file to generate an overall server configuration file which configures a server to operate in the desired manner so that user code can be successfully deployed on the configured server. The overall configuration file created may include server environment parameters that are required to initialize or start a server.

35 Claims, 8 Drawing Sheets

U.S. PATENT DOCUMENTS

| | | | |
|---|---|---|---|
| 6,567,849 B1 * | 5/2003 | Ludovici et al. | 709/223 |
| 6,718,373 B1 * | 4/2004 | Bearden et al. | 709/220 |
| 6,725,367 B1 * | 4/2004 | Morrison et al. | 713/1 |
| 6,728,766 B1 * | 4/2004 | Cox et al. | 709/220 |
| 6,754,702 B1 * | 6/2004 | Kennelly et al. | 709/223 |
| 6,775,830 B1 * | 8/2004 | Matsunami et al. | 717/176 |
| 2002/0107954 A1 * | 8/2002 | Ferguson et al. | 709/224 |
| 2002/0112038 A1 * | 8/2002 | Hessmer et al. | 709/220 |

OTHER PUBLICATIONS

EN997157—U.S. Appl. No. 09/135,147, filed Aug. 17, 1998, System and Method for an Administration Server, Streifert et al., 94 pgs.

* cited by examiner

FIG. 5A

```xml
<applicationserver:Domain xmi:version="2.0" xmlns:xmi="http://www.omg.org/XMI"
xmlns:applicationserver="applicationserver.xmi" xmlns:security="security.xmi"
xmlns:resources="resources.xmi" xmlns:server="server.xmi" xmi:id="Domain_1"
name="config1">
  <virtualHosts xmi:id="VirtualHost_1" name="default_host">
    <aliases xmi:id="HostAlias_1" hostname="*" port="8080"/>
    <defaultMimeEntries xmi:id="MimeEntry_1" type="image">
      <extensions>gif</extensions>
    </defaultMimeEntries>
  </virtualHosts>
  <security xmi:id="Security_1" cacheTimeout="30000" enabled="false"
activeAuthMechanism="LocalOSAuthentication_1">
    <authMechanisms xsi:type="security:LocalOSAuthentication"
xmi:id="LocalOSAuthentication_1">
      <userRegistry xsi:type="security:LocalOSUserRegistry" xmi:id="LocalOSUserRegistry_1"
serverId="localhost" serverPassword="{XOR}Jycn" name="LOCALOS">
      </userRegistry>
    </authMechanisms>
  </security>
  <resourceProviders xsi:type="resources:JDBCDriver" xmi:id="JDBCDriver_1"
name="Db2JdbcDriver" description="A JDBC Driver Description Goes Here"
implementationClassName="COM.ibm.db2.jdbc.app.DB2Driver" urlPrefix="jdbc:db2">
    </factories>
  </resourceProviders>
  <resourceProviders xsi:type="resources:URLProvider" xmi:id="URLProvider_1"
name="Default URL Factory" description="The default resource factory to use for creating
URL's" streamHandlerClassName="com.ibm.resources.URLResourceProvider"
protocol="piglatin">
    <factories xsi:type="resources:URL" xmi:id="URL_1" name="IBM Public"
jndiName="url/IBM-Public" category="<unfiled>"
spec="http://www.ibm.com/index.html">
      <propertySet xmi:id="URL_1_ps"/>
    </factories>
  </resourceProviders>
  <nodes xmi:id="Node_1" name="localhost">
    <servers xsi:type="applicationserver:ApplicationServer" xmi:id="ApplicationServer_1"
desiredExecutionState="START" name="Default Server" id="-1"
moduleVisibility="COMPATIBILITY">
      <processDefinition xsi:type="server:JavaProcessDef" xmi:id="ProcessDef_1"
executableName="java.exe" commandLineArguments="">
        <executionSettings xmi:id="ProcessExecution_1" processPriority="1000" umask="777"
runAsUser="root" runAsGroup="default"/>
        <ioRedirect xmi:id="OutputRedirect_1"
stdoutFilename="d:/apps/WebSphere/AppServer/logs/default_server_stdout.log"
stderrFilename="d:/apps/WebSphere/AppServer/logs/default_server_stderr.log"/>
```

FIG. 5B

```
<jvmSettings xmi:id="JavaVirtualMachine_1" classpath="" bootClasspath=""
verboseModeClass="false" verboseModeGarbageCollection="false" verboseModeJNI="false"
hprofArguments="" debugMode="false"/>
    </processDefinition>
    <transactionService xmi:id="TransactionService_1"
transactionLogFile="d:/apps/WebSphere/AppServer/tranlog/tran1.log,d:/apps/WebSphere/AppSe
rver/tranlog/tran2.log" totalTranLifetimeTimeout="60000" clientInactivityTimeout="30000"/>
    <traceService xmi:id="TraceServiceConfig_1" enable="false"
traceSpecification="com.ibm.ws.runtime.*=all=disabled"
traceOutputFilename="d:/apps/WebSphere/AppServer/logs/trace.log" diagThreadPort="7000"/>
    <namingServiceSettings xmi:id="NamingServiceProvider_1" providerHost="localhost"
providerPort="9070"
providerClassname="com.ibm.ejs.naming.transient.NamingServiceProvider"/>
    <webContainer xmi:id="WebContainer_1" installedWebModules="WebModuleRef_1
WebModuleRef_2">
      <transports xsi:type="applicationserver:HTTPTransport" xmi:id="HttpTransport_1"
hostname="" port="8080"/>
    </webContainer>
    <serverSecurityConfig xmi:id="ServerSecurityConfig_1"
useDomainQualifiedUserNames="false"/>
  </servers>
  <installedResourceProviders xmi:id="ResourceProviderRef_1"
classpath="c:/sqllib/java/db2java.zip" resourceProvider="JDBCDriver_1"/>
  <installedApps xmi:id="ApplicationRef_1" name="IBMUTC"
archiveURL="e:/demo/IBMUTC.ear">
    <modules xsi:type="applicationserver:WebModuleRef" xmi:id="WebModuleRef_1"
uri="UTC.war"/>
  </installedApps>
  <pathMap xmi:id="PathMap_1">
    <entries xmi:id="PathMapEntry_1" symbolicName="APP_INSTALL_ROOT"
path="e:\demo" description="The filesystem path to the directory which will contain installed
enterprise applications."/>
    <entries xmi:id="PathMapEntry_2" symbolicName="LOG_ROOT"
path="d:/apps/WebSphere/AppServer/logs" description="The filesystem path to the directory
which will contain server log files."/>
    <entries xmi:id="PathMapEntry_4" symbolicName="PRODUCT_INSTALL_ROOT"
path="d:/apps/WebSphere/AppServer" description="The filesystem path to the product
installation directory"/>
    <entries xmi:id="PathMapEntry_5" symbolicName="WAS_ROOT"
path="d:\apps\WebSphere\AppServer" description="The filesystem path to the product
installation directory"/>
  </pathMap>
 </nodes>
</applicationserver:Domain>
```

```
#This is a WebSphere v4.0 Remote Unit Test instance
#Wed May 09 10:14:42 EDT 2001
INSTANCE_WEBSPHERE_INSTALL_PATH=d:\apps\WebSphere\AppServer
INSTANCE_CONFIG_REF=/Servers/config1.serverConfiguration
INSTANCE_FILE_KEY=WebSphere\v4.0\Remote\Unit Test\Server\Instance
INSTANCE_SYS_PROP=
INSTANCE_HOST_ADDRESS=eyuentp
INSTANCE_CLASSPATH=
INSTANCE_PROFILE_PROCESS=false
INSTANCE_NAME=rinst20
INSTANCE_CONNECT_DATA_FILE_NAME=/Servers/rcopy20 remoteFileTransfer
INSTANCE_APP_DEPLOY_DIR=e:\\demo
```

FIGURE 6

SERVER CONFIGURATION TOOL

BACKGROUND OF INVENTION

1. Field of the Invention

The present invention relates generally to servers and their configuration and, more particularly, to a server configuration tool.

2. Background of the Invention

Computer servers are widely used in many computer installations. A computer server, forming part of a network of computer servers (hereinafter "servers") and computer clients (hereinafter "clients"), will receive requests for data, provide a wide variety of data processing services and transmit data to clients and other servers.

Servers, operating or being deployed on a computer system, provide a multitude of functions and services to other servers and other computer clients. A computer system may operate to act as a single server or may enable a number of servers to operate, independently.

Some well known types of servers include, for example, print servers (which provide printing services to other servers and/or clients), web servers (which provide web page services to connected computers), file servers (which provide file access and file storage services), application servers (which may provide business logic or application delivery services), database servers (which provide for the storage of databases and/or database management services) as well as many others.

Generically, a server will enable another computer (whether another server or a client) to process (e.g., running or execution, storage, handling, etc.) user code. User code can be any type of data such as executable code, files, databases and the like.

As will be understood by those of ordinary skill in the art, there numerous type of environments in which a server may be deployed. Examples of different operating environment variables which may affect the operation of a server include: whether a server may be one of many servers operating on a single computer system; the location in the network of a server; the location of files on the computer system or the network; the operating system being employed on the computer system in which the server is deployed; the user code the server is to process; as well as many parameters and variables. In order to reflect the variety of environments in which a server may be deployed, a server is typically configured in order to operate properly on the computer system on which the server will be deployed (i.e., located and executed).

However, there are large numbers of computer systems and servers which are employed in large networks. For example, an electronic business (e-business) network may include literally hundreds, and perhaps thousands of servers interconnected via some network such as, for example, the Internet. Accordingly, each server in this e-business network (and other networks) needs to be configured (which is usually performed through use of a configuration file which comprises, typically, text describing the configuration) so that the server operates as required. The configuration of a server is dependent upon both the computer system in which the server is operating and the user code which is to be deployed on the server.

As can be expected, due to the numerous changes made to both hardware and software in typical network environments, existing servers often need to be reconfigured and new servers need to configured and deployed. Accordingly, information technology (IT) departments in many large organizations spend inordinate amounts of time maintaining the configuration of the various servers. Presently, this maintenance work is typically performed manually and individually on each computer system. Some attempts have been made to reduce this maintenance workload by configuring each individual computer system identically. Unfortunately this approach to reduce workload reduces the flexibility of the network in which those identical computer systems operate.

In another shortcoming of present server configuration tools, when user code needs to be deployed on multiple servers (which may require the configuring hundreds of servers) on multiple computers, the task of deploying individual configurations for each server (in order to maintain network flexibility) is time consuming, prone to errors and costly.

In a further shortcoming, configurations for similarly (although not identically) deployed servers cannot be easily transferred between servers. This difficulty results from the required manual editing of the configuration file which must be performed on the server receiving a copy of a configuration file. This editing is tedious and, due to its technical nature, requires a technician with a fairly sophisticated understanding of the server, the computer system in which the server is deployed and the user code on which the server will operate. Locating and hiring personnel to perform and support such a task can be difficult for many organizations.

Additionally, known configuration tools require a user to manually transfer a server configuration and the server application (e.g., a web server application) to a remote server which requires configuration.

Accordingly, a server configuration tool which addresses, at least in part, some of these shortcomings is desired.

SUMMARY OF INVENTION

The present invention is directed to a server configuration tool which addresses, at least in part, the various shortcomings described above.

Embodiments of the present invention separate raw server configuration data (data, which has yet to be processed as described herein, describing behavior data or how the server is to operate (server operation parameters)—e.g., network port number, security settings, software drivers, etc.) from server instance data (data which describes operating environment data such as where to run a server and how to process user code (server processing parameters)—e.g., which directories to access, where the user code is located, etc.). Embodiments of the present invention may have raw server configuration data and server instance data stored as, for example, text files.

A file embodying raw server configuration data may be copied and reused on multiple computer systems. Similarly, a file embodying server instance data may also be copied and reused on the same computer system.

Embodiments of the present invention process the raw server configuration data file and the server instance file, effectively merging the two files, to generate an overall server configuration file which configures a server to operate in the desired manner so that user code can be successfully deployed on the configured server. However, as will be appreciated, the configuration data may, in some embodiments, comprise a plurality of data files.

In a further embodiment of the present invention, the raw server configuration data file and server instance file can be processed to generate an output file which includes other information for initializing or starting a server. This other information may include, for example, classpath, system properties and the like.

Through separation of the server raw server configuration data from the server instance data tremendous benefits can be achieved. For example, if a particular project (which is one or more pieces of user code) is to be deployed on multiple servers with each server operating on a differently configured computer system, the raw server configuration data may be used on these multiple servers with changes only made to various server instance data files. Thereafter, processing the raw server configuration data file and the modified server instance will result in a server reconfigured to operate as required with the same project. Similarly, if a server, which has been properly configured on a particular computer system so that a particular project operates as desired, needs to be reconfigured to operate on the same computer system but for a different project, then only the server configuration data file needs be modified. The various raw server configuration data files can then be processed with a single instance data file.

Advantageously, embodiments of the present invention reduce the amount of maintenance that must be performed in order to deploy: new projects; modified projects; new computer systems; modified computer systems; new servers; or modified servers.

In a further advantage, embodiments of the present invention enable wide reuse of portions of the configuration data (e.g., reuse of raw server configuration files and/or server instance configuration files) while maintaining flexibility in the overall network system.

In a further advantage, embodiments of the present invention enable differently skilled personnel, resulting in wider talent pool, to configure various aspects of a server/project combination. For example, personnel with an understanding of a project or particular user code can provide assistance in the generation of server instance data while other personnel, having an understanding of servers and computer system, can provide assistance in the generation of the raw server configuration data file.

In a further advantage, embodiments of the present invention can include or be used with, or incorporate, a publishing or remote file transfer to transmit or transfer a configuration data file and, if desired, the associated server application (e.g., a web server application) to remote computer systems. As will be apparent, embodiments of the present invention incorporating this feature enable administrators to remotely administer (i.e., configure and operate) a computer system.

In accordance with an aspect of the present invention there is provided a method for generating server configuration data for configuring a server, said method comprising: receiving raw server configuration data and server instance data, said raw server configuration data comprising a configuration token, and said server instance data comprising one or more instance tokens, each of said one or more instance tokens associated with an instance value; and generating server configuration data from said received raw server configuration and server instance data, wherein said server configuration data comprises merging said raw server configuration data and said server instance data.

In accordance with another aspect of the present invention there is provided a computer readable media storing data and instructions, said data and instructions, when executed by a computer system adapts said computer system to: receive raw server configuration data and server instance data, said raw server configuration data comprising a configuration token, and said server instance data comprising one or more instance tokens, each of said one or more instance tokens associated with an instance value; and generate server configuration data from said received raw server configuration and server instance data, wherein said server configuration data comprises merging said raw server configuration data and said server instance data.

In accordance with still another aspect of the present invention there is provided a computer system for configuring another computer system, said computer system adapted to: receive raw server configuration data and server instance data, said raw server configuration data comprising a configuration token, and said server instance data comprising one or more instance tokens, each of said one or more instance tokens associated with an instance value; and generate server configuration data from said received raw server configuration and server instance data, wherein said server configuration data comprises merging said raw server configuration data and said server instance data.

In accordance with still another aspect of the present invention there is provided A method for generating a server configuration file comprising: merging first data and second data, said first data comprising raw server configuration data and said second data comprising server instance data.

Other aspects and features of the present invention will become apparent to those ordinarily skilled in the art upon review of the following description of specific embodiments of the invention in conjunction with the accompanying figures.

BRIEF DESCRIPTION OF DRAWINGS

In the figures which illustrate an example embodiment of this invention:

FIG. 5, which comprises FIGS. 5A and 5B, is an example of a raw server configuration file used by the computer system of FIG. 1 and processed by the operations performed and illustrated in FIGS. 4 and 4A; and FIG. 6 is an example of a server instance configuration file used by the computer system of FIG. 1 and processed by the operations performed and illustrated in FIGS. 4 and 4A.

DETAILED DESCRIPTION

Figure 1:
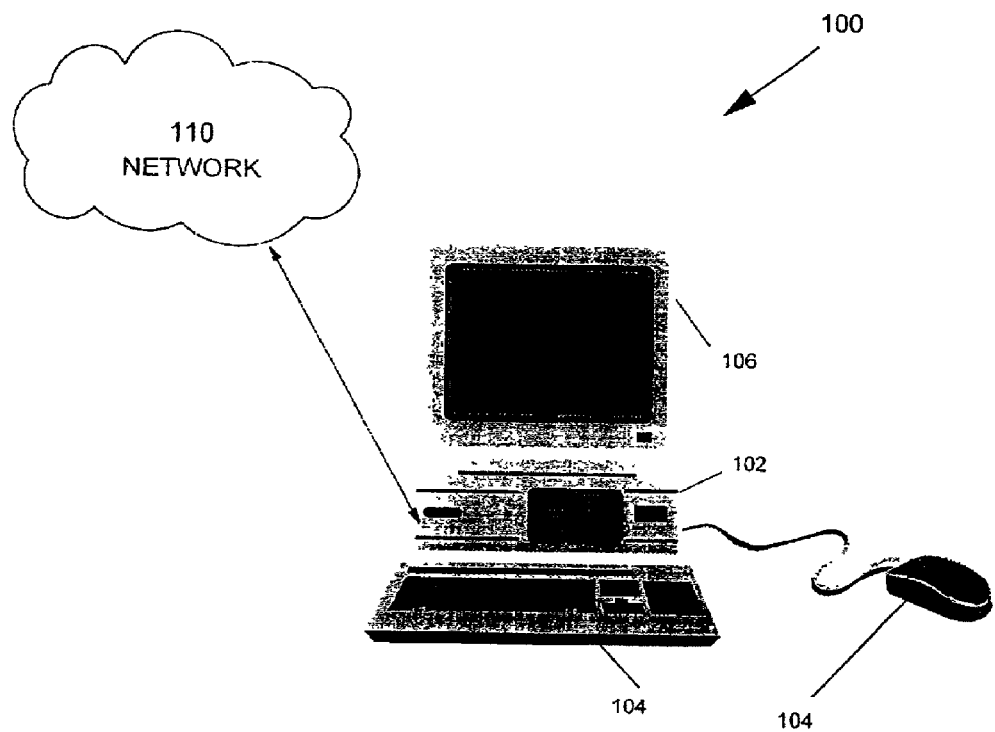
FIG. 1 schematically illustrates a computer system embodying aspects of the invention.

An embodiment of the invention, computer system 100, is illustrated in FIG. 1.

Computer system 100, illustrated for exemplary purposes as a networked computing device, is in communication with other networked computing devices (not shown) via network 110. As will be appreciated by those of ordinary skill in the art, network 110 may be embodied using conventional networking technologies and may include one or more of the following: local area networks, wide area networks, intranets, public Internet and the like. As is discussed with reference to FIG. 8, computer system 100 may interact with other networked computer systems (not shown) providing application analysis of a distributed application.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 110. However, for ease of understanding, aspects of the invention have been embodied in a single computing device—computer system 100.

Computer system 100 includes processing system 102 which communicates with various input devices 104, output devices 106 and network 110. Input devices 104, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Figure 2:
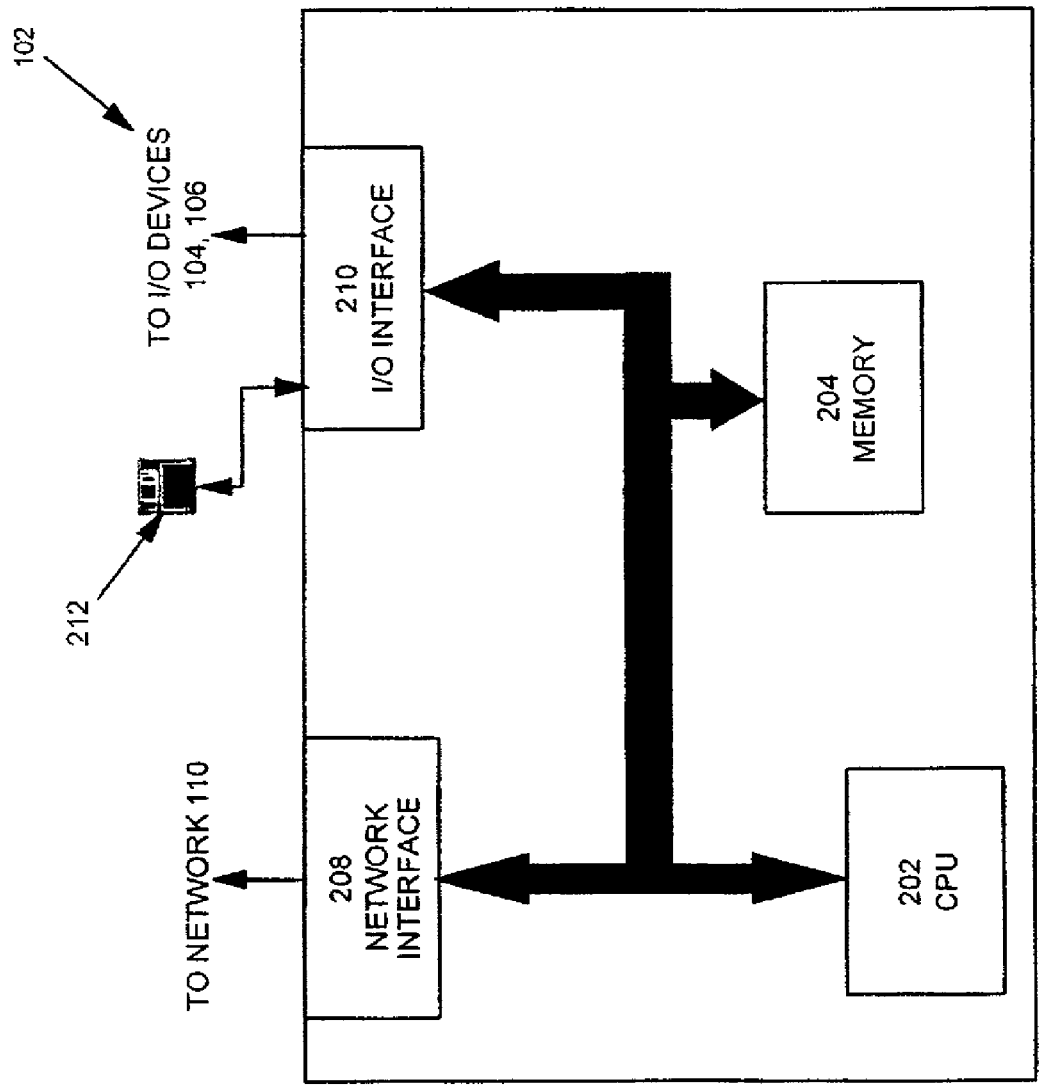
FIG. 2 schematically illustrates, in greater detail, a portion of the computer system of FIG. 1.

Exemplary processing system 102 is illustrated in greater detail in FIG. 2. As illustrated, processing system 102 includes several components—central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. CPU 202 may include various support circuits to enable communication between itself and the other components of processing system 102.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive.

Network I/F 208 enables communication between computer system 100 and other network computing devices (not shown) via network 110. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 110.

I/O I/F 210 enables communication between processing system 102 and the various I/O devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 or as a removable data storage device.

Figure 3:
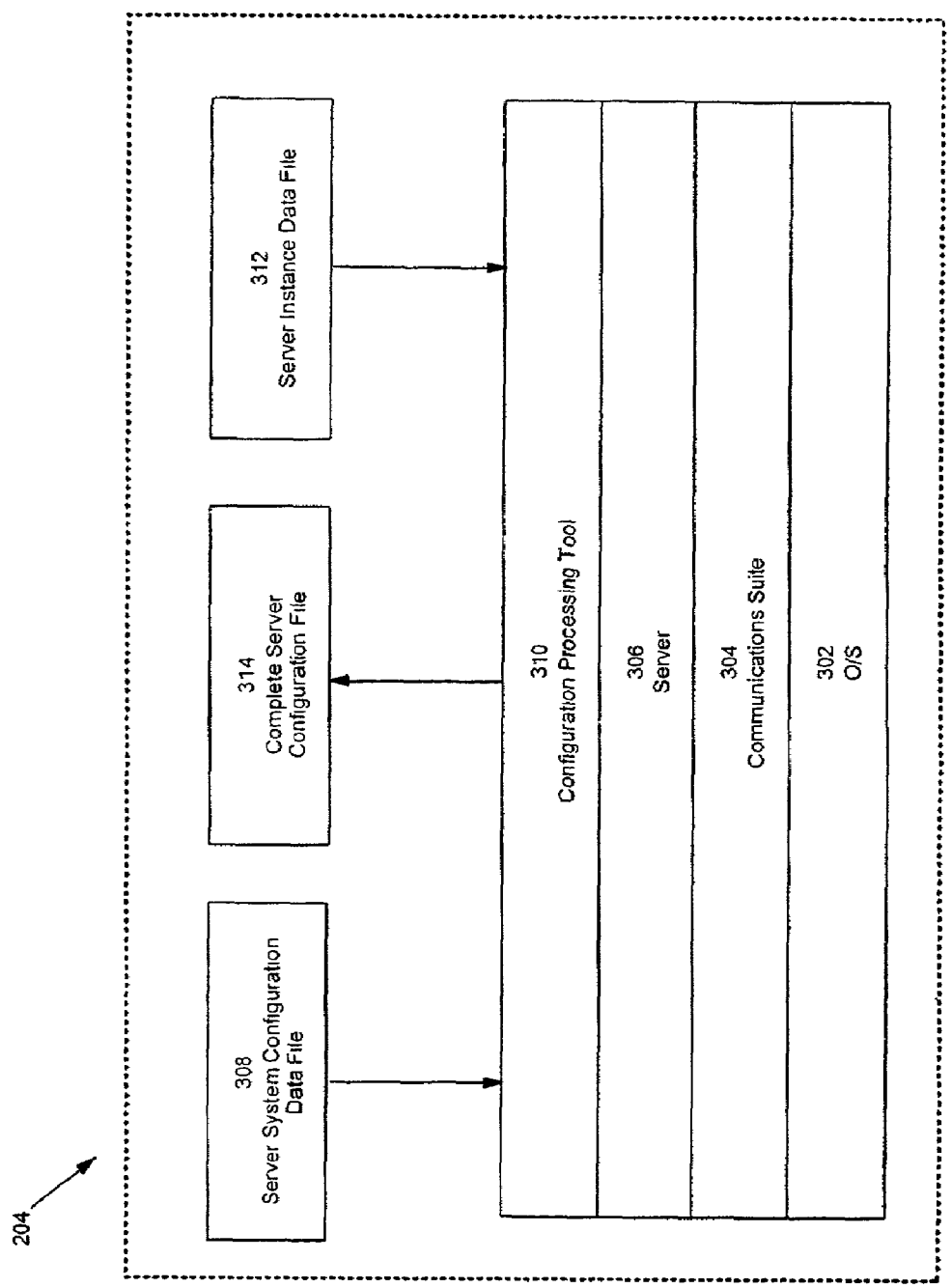
FIG. 3 illustrates, in functional block form, a portion of FIG. 2.

The computer instructions/applications stored in memory 204 and executed by CPU 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

As illustrated, for exemplary purposes only, memory 202 stores operating system (OS) 302, communications suite 304, server 306, configuration processing tool 310, server raw server configuration data file 308, server instance configuration data file 312 and complete server configuration file 314.

OS 302 is an operating system suitable for operation with a selected CPU 202 and the operations described herein. Multitasking, multithreaded OSes such as, for example, IBM AIX™, Microsoft Windows NT™, Linux or the like, are expected in many embodiments to be preferred.

Communication suite 304 provides, through, interaction with OS 302 and network I/F 208 (FIG. 2), suitable communication protocols to enable communication with other networked computing devices via network 110 (FIG. 1). Communication suite 304 may include one or more of such protocols such as TCP/IP, ethernet, token ring and the like.

In the exemplary embodiment, the various input files (data files 308 and 312), output file 314, configuration processing tool 310 and server 306 are illustrated as residing on a single computer system 100. However, as those of ordinary skill in the art will appreciate, and as alluded to above, alternative embodiments of the present invention may have the various components which comprise aspects of the present invention distributed amongst various computer systems which communicate through the services provided by communication suite 304.

Server 306 is a conventional server (e.g., print server, file server, database server, application server, etc.) which requires configuration to operate as desired on computer system 100. The configuration of server 306 is provided by complete server configuration file 314 (described below). Aspects of server 306 which require configuration include configuration data which can be considered specific to computer system 100 (referred to herein as "system settings") and configuration data which can be considered specific to the user code or project data (referred to herein as "project settings") which is to be processed by server 306. System settings may include, for example, security settings, network settings, Multipurpose Internet Mail Extensions (MIME) entries, Java™ virtual machine settings, communication protocol settings and the like. Project settings may include, for example, data relating to data logging settings, location of user code or project directories, log file locations, application identity and location to be executed for the processing of a project and other similar settings.

Configuration processing tool 310 (hereinafter "configuration tool 310") is adapted to receive configuration data, arranged in the exemplary embodiment as raw server configuration data file 308 (hereinafter "raw server configuration file 308") and server instance data file 312 (hereinafter "instance file 312"), for processing. The received data files are processed (described in greater detail below with reference to operations 400 illustrated as a flow chart in FIG. 4) to generate an overall or complete server configuration file 314.

Configuration tool 310 may present the user with a graphical user interface (GUI) or be text or command line based. Initialization and execution of configuration tool 310 may be commenced by selecting an icon (e.g., in a GUI environment), entering the name of the file(s) embodying configuration tool 310 on a command line, calling or launching configuration tool 310 using an application program interface (API) or other known methods.

Raw server configuration data file 308 is, in the exemplary embodiment, a text file which contains data related to the computer system 100 which executes server 306 (i.e., server operation parameters). Raw server configuration data file 308 describes behavior data. An example of a raw server configuration file 308 is illustrated in FIG. 5. Specific portions of the example raw server configuration file 308 are highlighted in FIG. 5 by a bolded and underlined font. The importance and meaning of these highlighted portions are described below with reference to FIGS. 4 and 6. It should be noted that FIG. 5 is an excerpt from a complete configuration file.

The raw server configuration file 308 illustrated in FIG. 5 is formatted in accordance with the extensible Markup Language (XML) Metadata Interchange (XMI) format. However, other data formats could equally be employed in alternative embodiments. For example, raw server configuration file 308 could, in alternative embodiments, include a standard ASCII text file with some proprietary format, an HTML file, XML file or the like. Additionally, while the exemplary embodiment of raw server configuration file 308 is an ASCII text file, a binary file could also be employed.

Instance file 312, like raw server configuration file 308, provides data which is used to configure server 306 to properly process a project or user code. Instance file 312 describes operating environment data. Instance file 312, as described above, contains data which is generally system environment specific (i.e., server processing parameters). Accordingly, examples of instance file 312 may include data pertaining to: which directories to access to process a project; applications to be used to properly process a project; the location of the project; location of event logging files; information required to publish or transfer server configuration and application data; server environment parameters (e.g. classpath, system properties variables, etc.) and the like.

An exemplary instance file 312 is illustrated in FIG. 6. As shown in the illustration, the exemplary instance file 312 includes a comment portion 602 (which is ignored during processing by configuration tool 310) and a token and settings portion 604. The token and settings portion 604 includes a list of tokens 606A, 606B, . . . , 606i (collectively and individually "tokens 606") and the values or settings 608A, 608B, . . . , 608i (collectively and individually "token settings 608") associated with those tokens. The names or identities of the tokens 606 are defined by a user (e.g., the owner or creator of the project which is to be processed by a configured server 306). Names or identities of tokens 606 may be selected to provide some assistance to persons reading or editing instance file 312 to understand the purpose of the associated token 606. For example, token 606A (INSTANCE_WEBSPHERE_INSTALL_PATH), which is associated with the token value 608A ("d\:\\apps\\WebSphere\\AppServer"), provides a token which will be used by configuration tool 310 to generate in the overall configuration data file 314 the location of the application (the application server included in the WebSphere® product from IBM Corporation) that is to be processed by server 306.

While files 308, 312 and 314 are illustrated and described in the exemplary embodiment as a text file, persons of ordinary skill in the art will appreciate that, in alternative embodiments, these files could be formatted in other manners. For example, instance file 312 could be a binary file, a lookup table, a database or other manners for associating a first data element (e.g., a token) with a second data element (e.g., a value or setting). Additionally, files 308, 312 and/or 314 could be, for example, a non-text file, a binary stream of data as well as others.

Figure 4:
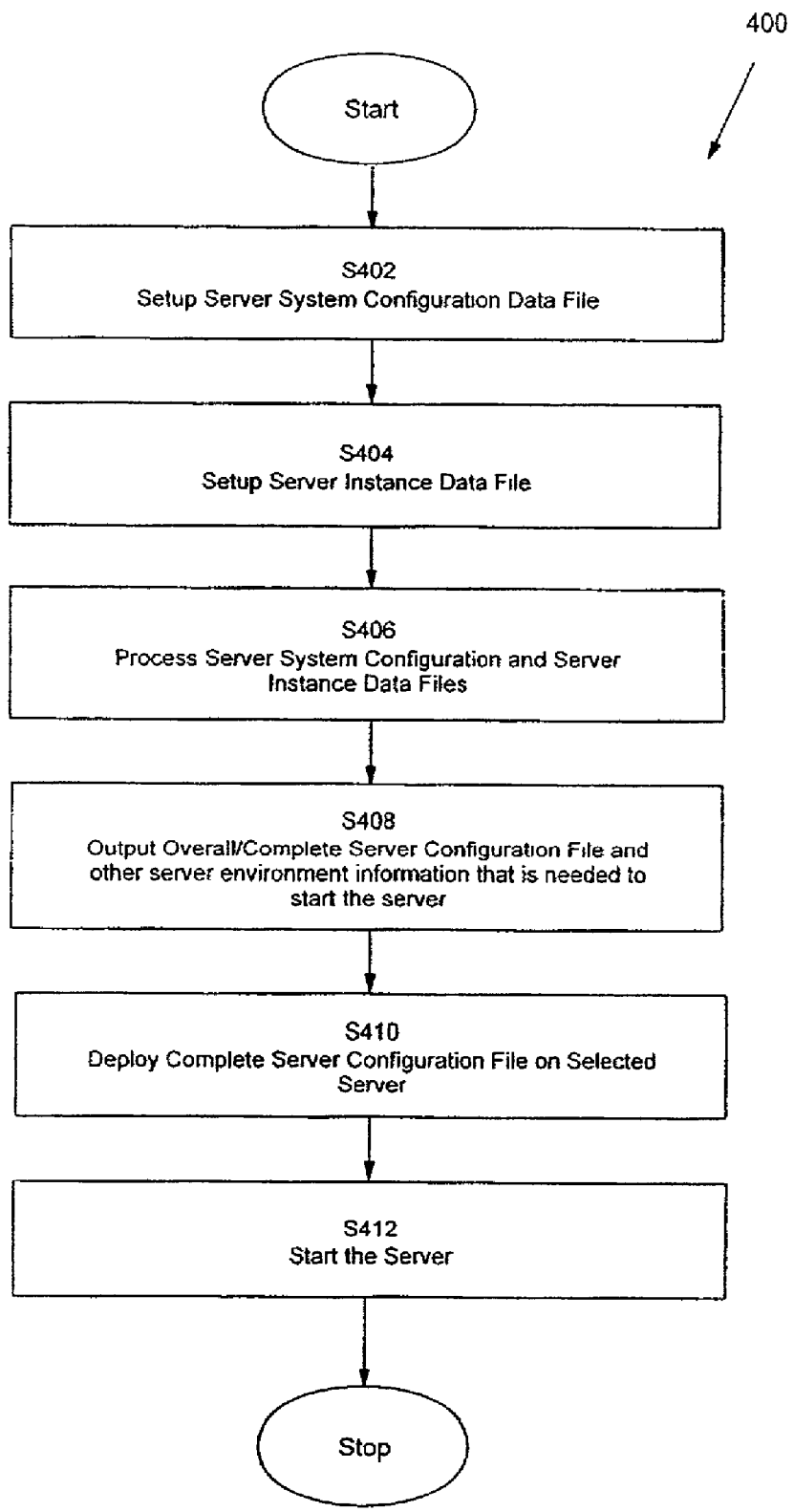
FIG. 4 is a flowchart of exemplary operations of the computer system of FIG. 1.

The operation of computer system 100, and specifically configuration tool 310 and the use of input data files 308, 312, is best understood with reference to operations 400 (performed by computer system 100) illustrated in flow chart form in FIG. 4.

Initially, a raw server configuration file 308 is created. Raw server configuration file 308 may be created by the administrator of computer system 100 or server 306 or copied (and, if necessary, modified) from another system 100 (S402). Similarly, an instance file 312 is also created (or copied). An instance file will, typically (and not always) be created/modified by the owner/administrator of the project or user code which is to be processed by server 306 (S404). As will be appreciated, operations S402 and S404 can be reversed in order.

Raw server configuration file 308 and instance file 312 (input files) are then provided to configuration tool 310. As indicated above, configuration tool 310 may present to a user of configuration tool 310 a GUI. In such an embodiment of the present invention, a simple "File Open" dialog box (familiar to those of skill in the art), selecting a graphic representation (e.g. icon) of a server instance and clicking on a "start" server icon may be employed. If configuration tool 310 is invoked using a command line interface (CLIF), configuration tool 310 may be provided with the location and identities of the input files as part of the command line variables used to execute configuration tool 310.

In any event, configuration tool 310, upon receipt of input files 308 and 312, processes the files (S406) and generates and outputs overall server configuration file 314 (and, optionally, other server environment data for initializing server 306) (S408) which configures server 306, when deployed, in the ordinary manner (S410). Server 306 is then initialized or started using overall server configuration file 314. The processing performed by configuration tool 310 of input files 308 and 312 results in a merging of the data contained therein which is then output as output file 314.

The merging performed in the exemplary embodiment described hereinafter copies raw server configuration file 308 into output file 314 and, thereafter, replaces portions (referred to as tokens which may be, for example, a string sequence or other identifier) in output file with data from server instance file 312. As will be appreciated, other processes could be employed to perform the merging operation. For example, in place of tokens position data (which could be relative position or absolute position data) could be employed. Position data, would act as a pointer to data in raw configuration data which needs to be replaced or modified by data found in server instance file, could be in the form of a tree position, line position (within a text file, for example) or other similar forms.

Figure 4A:
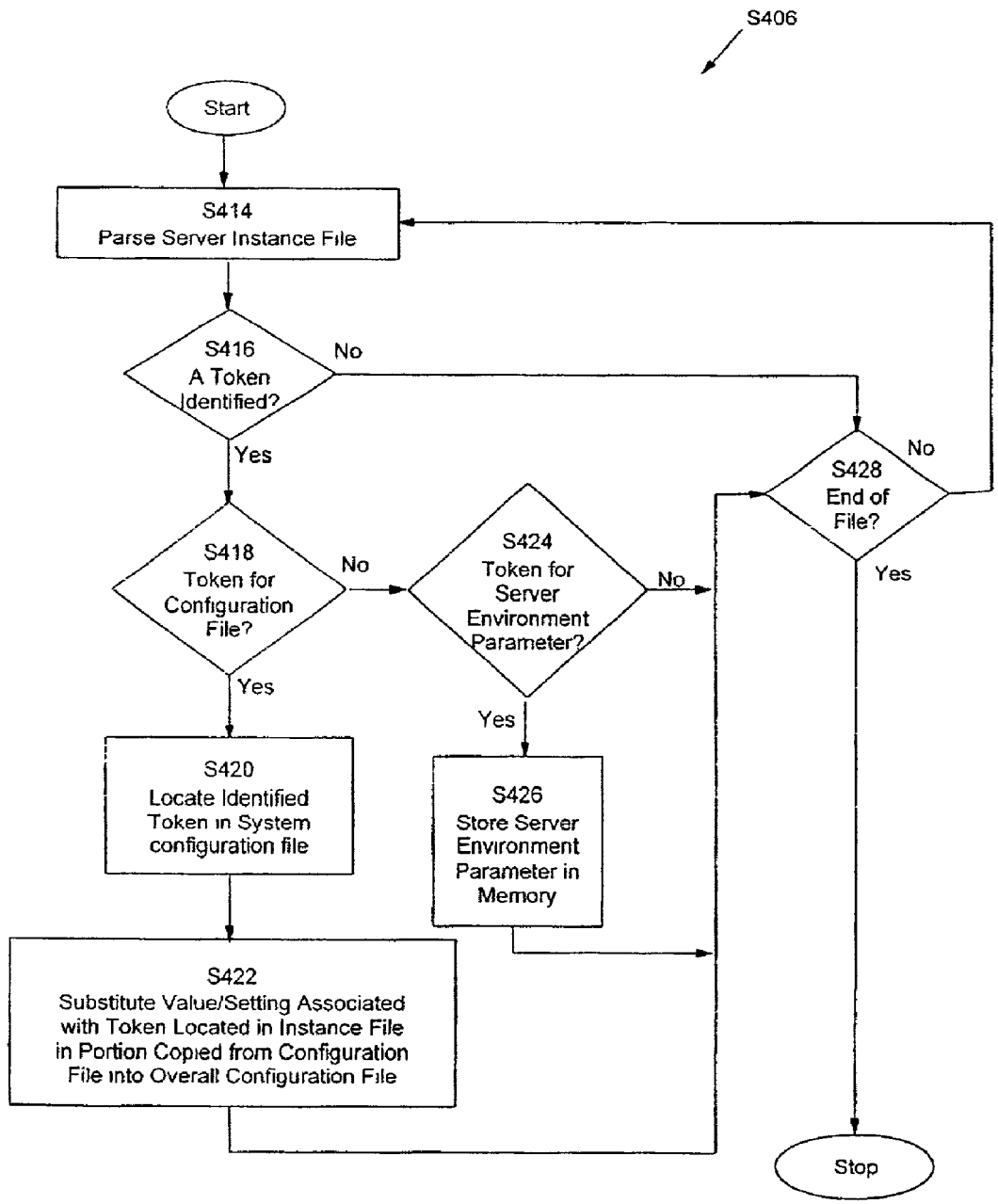
FIG. 4A is a flowchart which illustrates, in greater detail, a portion of the flowchart of FIG. 4.

The processing in operation S406 is better understood with reference to the flowchart in FIG. 4A. As illustrated in FIG. 4A, in operation S406 configuration tool 310 initially parses server instance file 312 to identify whether any tokens present (such tokens are identified in the exemplary in FIG. 5 by the bolded and underlined font which is used) (S414).

Server instance file 312 (which, in the exemplary embodiment is an XMI file) may be parsed using known XMI parsers. Alternative parsers could obviously be employed in alternative embodiments.

In the present embodiment, the XMI file (illustrated in the exemplary FIG. 5) has a predefined syntax that allows a parser to read the file and generate a model representation of the configuration data. The information within the model can then be modified by changing the data in the model. The overall configuration file is generated in XMI using the modified data. However, as those of ordinary skill in the art will appreciate, the structure or format of input and output files can be altered.

If a token 606 is identified (S416), configuration tool 310 determines if the identified token is relates to the configuration file (S418). If the token identified in server instance file 312 is for the configuration file 308, configuration tool 310 locates the identified token in configuration file 308 (S420). Once the token identified in server instance file 312 is also located in raw server configuration file 308 (tokens in configuration file 308 being bolded and underlined) (S420), the portion of raw server configuration file 308 which includes the identified token 606 is copied to the output file (overall configuration file 314) with the token 606 being replaced with the value/setting 608 located in instance file 312 (S422). The end of file check operation of S428 is then performed.

If, in S416, configuration tool does not identify as it parses instance file 312, configuration tool 310 determines if the end of file 312 has been reached (S428). If the end of instance file 312 has been reached, operation S406 ceases. If the end of instance file 312 has not been reached (S428), configuration tool 310 continues to parse instance file 312.

If, S418 (after a token 606 has been identified in instance file 312) configuration tool 310 determines that the identified token does not relate to the configuration of a server, configuration tool 310 determines whether the identified token is a server environment parameter (S424). If the identified token is a server environment parameter, this data is stored in memory (or, alternatively, as a data object such as, for example, a file) for use in starting server 306 (S426).

After performing operations S424 and 5426, the end of file check of operations S428 is performed.

The result of operations S414–S422 is the generation of a configuration file 314 which, although based on two separate files which are, respectively, associated with server raw server configuration data and server instance data, are processed to generate a configuration file which can be employed to conventionally configure a server 306. As indicated above, operations 400 can, in addition to generating final configuration file(s), be employed to also generate some server environment parameters for initializing or starting a server.

Those of ordinary skill in the art will appreciate that the operations described in FIGS. 4 and 4A may be rearranged, combined or otherwise altered while still falling within the sphere and scope of the present invention. For example, while the operations describe, for each token identified in a server instance file, search for a corresponding token in the raw server configuration file, this operation could be reversed. That is, an alternative embodiment could be embodied wherein for each token identified in a raw server configuration file, a search for a corresponding token in the server instance file could be performed.

From the foregoing description, persons of ordinary skill of the art will appreciate the advantages that embodiments of the present invention will provide. For example, as a result of the separation of the raw server configuration data from the server instance data, the present invention for a particular project or user code, enables the server configuration data to be used on multiple servers with changes made only to various server instance data files (i.e., the server configuration data files require no modification). Similarly, if a server needs to be reconfigured (the server having been properly configured on a particular computer system so that a particular project operates as desired) to operate on the same computer system but for a different project, then only the raw server configuration data file needs be modified. Thereafter, processing the server instance data file and the modified raw server configuration will result in a new server configuration file which operates to reconfigured the server so that the server operates as required.

Advantageously, embodiments of the present invention reduce the amount of maintenance that must be performed in order to deploy: new projects; modified projects; new computer systems, modified computer systems; new servers; or modified servers.

In a further advantage, "stock" or frequently used raw server configuration files and frequently used server instance files can be stored in a database (or other storage facility) and combined into a very large number of server configurations.

In a further advantage, embodiments of the present invention enable wide reuse of portions of the configuration data (e.g., reuse of raw server configuration files and/or server instance configuration files) while maintaining flexibility in the overall network system.

In a further advantage, embodiments of the present invention enable differently skilled personnel, resulting in wider talent pool, to configure various aspects of a server/project combination. For example, personnel with an understanding of a project or particular user code can provide assistance in the generation of server configuration data while other personnel, having an understanding of servers and computer system, can provide assistance in the generation of the server instance data file.

As will be appreciated by those skilled in the art, modifications to the above-described embodiment can be made without departing from the essence of the invention. For example, the server instance data may contain publishing data so that the server configuration and the server application data (e.g. a web application) can be automatically transferred to a remote server. This will enable a server to be initialized or started automatically immediately after the transfer since the computer system receiving the transferred configuration and application data will have received all the data necessary to start the server.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

The invention claimed is:

1. A method for generating server configuration data for configuring a server, said method comprising the steps of:
   receiving raw server configuration data and server instance data, said raw server configuration data comprising a configuration token, and said server instance data comprising one or more instance tokens, each of said one or more instance tokens associated with an instance value; and generating server configuration data by merging said received raw server configuration and server instance data, said merging comprising:

copying said raw server configuration data to form said server configuration data and replacing a configuration token in said raw server configuration data with instance values associated with an instance token in said server instance data, said instance token in said server instance data corresponding to said configuration token in said raw server configuration data.

2. The method of claim 1, wherein said generating step further comprises the steps of:
identifying in said raw server configuration data and said server instance data corresponding configuration and server instance tokens.

3. The method of claim 2, wherein said identifying step further comprises the steps of:
locating in said server instance data, server instance tokens; and
for each server instance token located;
determining if said raw server configuration data includes a corresponding configuration token.

4. The method of claim 3, further comprising the step of for each server instance token located:
prior to said determining, assessing if said server instance token located comprises a token associated with a configuration parameter; and
if said server instance token located comprises a token associated with a configuration parameter, performing said determining.

5. The method of claim 1 further comprising the step of:
transmitting said server configuration data to a remote computer system.

6. The method of claim 1 further comprising the step of providing said raw server configuration data as server operation parameters and said server instance data as server processing parameters.

7. The method of claim 6 further comprising the step of providing said server instance data as server environment parameters.

8. The method of claim 1 wherein said merging steps comprises:
copying said raw server configuration data so as to form said server configuration data;
identifying a portion of said server configuration data that requires modification;
replacing said portion identified with a value associated with a corresponding portion in said server instance data.

9. The method of claim 1 further comprising the step of providing said raw server configuration data as one or more data files and said server instance data as one or more data files.

10. The method of claim 1 further comprising the step of providing the server configuration data generated as a modification of said raw server configuration data.

11. The method of claim 1 further comprising the step of starting a server on a computer system employing said server configuration data.

12. A computer readable media storing data and instructions, said data and instructions, when executed by a computer system adapts said computer system to:
receive raw server configuration data and server instance data, said raw server configuration data comprising a configuration token, and said server instance data comprising one or more instance tokens, each of said one or more instance tokens associated with an instance value; and generate server configuration data by merging said received raw server configuration and server instance data, said merging comprising:

copying said raw server configuration data to form said server configuration data and replacing a configuration token in said raw server configuration data with instance values associated with an instance token in said server instance data, said instance token in said server instance data corresponding to said configuration token in said raw server configuration data.

13. The computer readable media of claim 12, wherein said data and instructions adapting said computer system to generate server configuration data comprises data and instructions to adapt said computer system to:
identify in said raw server configuration data and said server instance data corresponding configuration and server instance tokens.

14. The computer readable media of claim 13, wherein said data and instructions adapting said computer system to identify in said raw server configuration data and said server instance data corresponding configuration and server instance tokens comprises data and instructions to adapt said computer system to:
locate in said server instance data, server instance tokens; and
for each server instance token located;
determine if said raw server configuration data includes a corresponding configuration token.

15. The computer readable media of claim 14, wherein said data and instructions adapting said computer system to determine for each server instance token located further comprises data and instructions to adapt said computer system to:
prior to said determining, assess if said server instance token located comprises a token associated with a configuration parameter; and
if said server instance token located comprises a token associated with a configuration parameter, performing said determining.

16. The computer readable media of claim 12, wherein said data and instructions further adapt said computer system to:
transmit said server configuration data to a remote computer system.

17. The computer readable media of claim 12, wherein said raw server configuration data comprises server operation parameters and said server instance data comprises server processing parameters.

18. The computer readable media of claim 17 wherein said server instance data further comprises server environment parameters.

19. The computer readable media of claim 12 wherein said raw server configuration data comprises one or more data files and said server instance data comprises one or more data files.

20. The method of claim 12 wherein the server configuration data generated comprises a modification of said raw server configuration data.

21. The computer readable media of claim 12 further comprising data and instructions adapting said computer system to start a server on a computer system employing said server configuration data.

22. A computer system for configuring another computer system, said computer system adapted to:
receive raw server configuration data and server instance data, said raw server configuration data comprising a configuration token, and said server instance data comprising one or more instance tokens, each of said one or more instance tokens associated with an instance value; and
generate server configuration data by merging said received raw server configuration and server instance data, said meriting comprising:
copying said raw server configuration data to form said server configuration data and replacing a configuration token in said raw server configuration data with instance values associated with an instance token in said server instance data, said instance token in said server instance data corresponding to said configuration token in said raw server configuration data.

23. The computer system of claim 22 wherein said adaptation to generate server configuration data comprises an adaptation to:
identify in said raw server configuration data and said server instance data corresponding configuration and server instance tokens.

24. The computer system of claim 23, wherein said adaptation to identify in said raw server configuration data and said server instance data corresponding configuration and server instance tokens comprises an adaptation to:
locate in said server instance data, server instance tokens; and
for each server instance token located;
determine if said raw server configuration data includes a corresponding configuration token.

25. The computer system of claim 24, wherein said adaptation to determine for each server instance token located further comprises an adaptation to:
prior to said determining, assess if said server instance token located comprises a token associated with a configuration parameter; and
if said server instance token located comprises a token associated with a configuration parameter, performing said determining.

26. The computer system of claim 22, wherein said computer system is further adapted to:
transmit said server configuration data to a remote computer system.

27. The computer system of claim 22 wherein said raw server configuration data comprises server operation parameters and said server instance data comprises server processing parameters.

28. The computer system of claim 27 wherein said server instance data further comprises server environment parameters.

29. The computer system of claim 22 wherein said raw server configuration data comprises one or more data files and said server instance data comprises one or more data files.

30. The computer system of claim 22 wherein the server configuration data generated comprises a modification of said raw server configuration data.

31. The computer system of claim 22 further adapted to start a server on a computer system employing said server configuration data.

32. A method for generating a server configuration file comprising the step of:
implementing a configuration tool for merging first data and second data, wherein said first data comprises raw server configuration data including a configuration token and said second data comprising server instance data including one or more values associated with said configuration token, said configuration tool replacing a configuration token in said raw server configuration data with values associated with an instance token in said server instance data, said instance token in said server instance data corresponding to said configuration token in said raw server configuration data.

33. The method of claim 32 further comprising the step of providing said raw server configuration data as behavior data and said server instance data as operating environment data.

34. The method of claim 33 further comprising the step of providing said behavior data as one or more of: port numbers; host name; MIME types; security parameters; memory resource parameters; and CPU resource parameters; and said operating environment data as one or more of: path names; environment variables; publishing data; and server specific variables dependent upon computer system specific variables.

35. The method of claim 32 wherein said merging step further comprises the step of generating a separate server configuration file.

* * * * *